Oct. 11, 1932.  J. F. WALLACE  1,882,349

AIRPLANE STRUT

Filed May 10, 1930

Inventor
John F. Wallace
Kwis Hudson & Kent
attys.

Patented Oct. 11, 1932

1,882,349

UNITED STATES PATENT OFFICE

JOHN F. WALLACE, OF CLEVELAND, OHIO, ASSIGNOR TO THE CLEVELAND PNEUMATIC TOOL COMPANY, OF CLEVELAND, OHIO, A CORPORATION OF OHIO

AIRPLANE STRUT

Application filed May 10, 1930. Serial No. 451,249.

This invention relates to improvements in airplane struts, more particularly hydro-pneumatic shock absorbers for airplanes and other vehicles.

One of the objects of the invention is the provision of a strut of this character having a valve construction of extreme simplicity.

Another object is the provision of a strut which may be quickly and easily disassembled and reassembled for servicing and repair purposes.

Another object is the provision of a construction in which the valve seat and the packing holder are contained in a single piece that is removably attached to the end of the inner cylinder.

Figure 1:
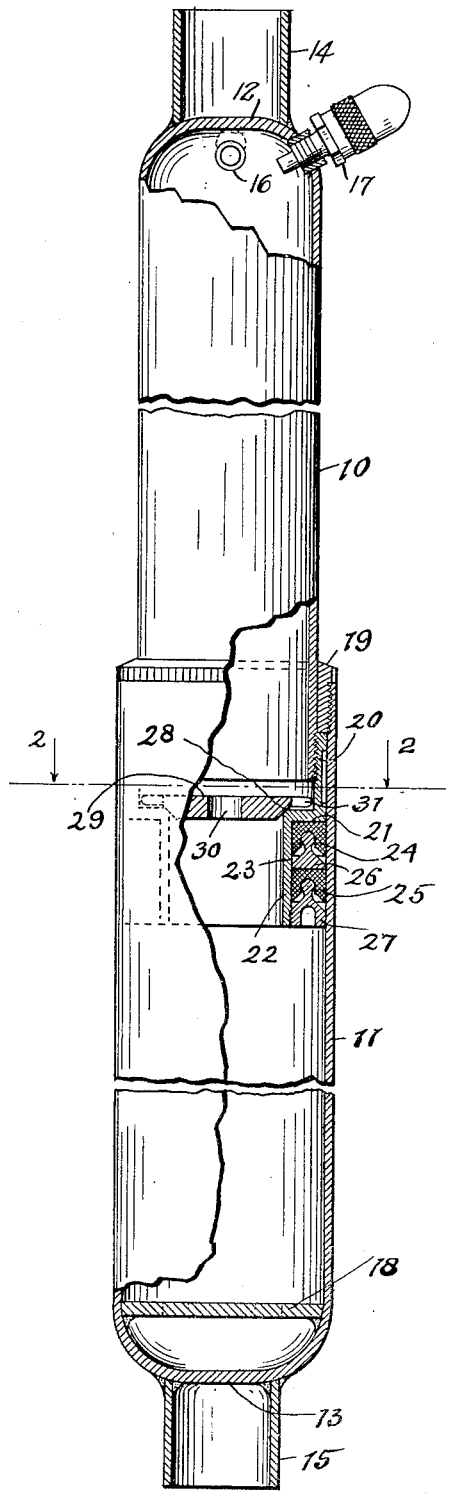

Other objects and features of novelty will appear as I proceed with the description of that embodiment of the invention which, for the purposes of the present application, I have illustrated in the accompanying drawing, in which Figure 1 is an elevational view of one embodiment of the invention, certain parts being broken away and others shown in vertical central section in order to more fully illustrate the invention.

Figure 2:
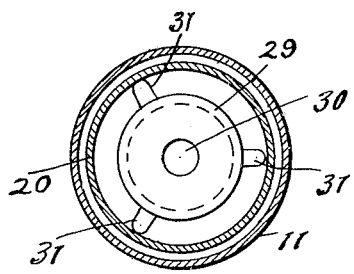

Figure 2 is a cross sectional detail view taken substantially on the line 2—2 of Figure 1.

In the drawing I have shown two cylinders 10 and 11 constructed of sheet metal tubing, steel tubing being the preferred material. At their outer ends these cylinders are spun inwardly to form cylinder heads 12 and 13 respectively. Onto these heads there may be welded tubular pieces 14 and 15, to which the fittings for attachment to the wings or fuselage of the airplane and its running gear may be secured. In the upper end of cylinder 10 I provide a filler opening 16 for the oil and an air valve 17 through which the strut may be inflated. Near the bottom of cylinder 11 I mount a metal reinforcing disk 18. This disk may be welded to the interior wall of the cylinder before the metal is spun over beneath it.

Cylinder 11 is internally threaded at its upper end for the reception of a stop ring 19, which is of the proper size to fill the space between the two cylinders and slidably fit the cylinder 10. This ring is serrated or otherwise formed for ready manipulation, so that it may be easily applied and removed when necessary. The ring 19 serves, of course, as a reinforcement, as well as a means for limiting the extension of the strut and guiding the cylinder 10.

The outer end of the cylinder 10 is threaded for the reception of a shank portion 20 of a piston head structure. This shank portion is of the same thickness as the stop ring 19, so as to fill the space between the cylinders and guide the movement of the cylinder 10. As shown in the drawing, the shank portion 20 extends for a distance beyond the end of the cylinder 10, where it merges into an inwardly extending annular shoulder 21 which joints the portion 20 with an offset cylindrical portion 22, forming the inner wall of an annular recess 23. Packing of any suitable character is mounted in the recess 23. In the present instance this packing takes the form of two resilient packing rings 24 and 25 separated by a metallic spacing ring 26. The rings 24, 25 and 26 may be held against accidental movement downward relative to the piston head by a metal ring 27 which is threaded to the cylindrical portion 22 thereof.

The corner of the piston head structure at the juncture of the shoulder 21 and the cylindrical portion 22 is machined off to form a conical valve seat 28. A disk shaped valve piece 29, having a complementary surface, is adapted to rest upon this seat normally. It is provided with a continuously open port 30, the size of which may be varied as desired to control the speed of the rebound action of the strut. To limit the upward movement of the valve seat and to guide its vertical movement, I provide the valve piece with three extensions 31 loosely engaging the inner wall of the shank portion 20 of the piston head structure, and adapted to engage the end surface of the cylinder 10 when the valve opens.

In order to put the strut into service, its ends are attached by suitable means between the parts of an airplane whose relative movements are to be cushioned, it being understood that this arrangement shall bring the strut into an approximately upright position. Oil is then poured into the strut through the filler opening 16 to substantially fill the strut in its compressed condition. This opening is then closed, and a compressed air line is attached to the air valve 17, and the strut is inflated to a predetermined extent, that is sufficiently to extend the cylinders 10 and 11 the required amount. In Fig. 1 they are illustrated as extended to the limit, which condition will obtain only when the plane is in flight. When the plane alights upon the ground, the running gear is forced upward suddenly and delivers a heavy impact in the upward direction to the cylinder 11, causing the two cylinders 10 and 11 to telescope together. The oil in cylinder 11 therefore seeks to flow into cylinder 10. Being unable to flow with sufficient rapidity through port 30, it raises the valve piece 29 and flows through the annular opening surrounding the valve piece. Now, when the air in cylinder 10 has been compressed to the extent where its pressure equals the pressure of the impact, the telescoping movement stops, and the highly compressed air in cylinder 10 tends to again expand the cylinders rapidly. In the present construction this rebound movement is checked, because the valve piece 29 immediately seats itself upon the seat 28, whereupon all further transfer of oil from the cylinder 10 to the cylinder 11 must take place through the port 30. The rebound stroke is therefore slowed up accordingly.

Whenever it becomes necessary, for any reason, to remove the valve piece 29, the stop ring 19 is merely unscrewed, the cylinder 11 is pulled outwardly over the piston head, and then the latter is unscrewed from the cylinder 10. The removal of the cylinder 11 also, of course, exposes the packing rings 24, 25, 26 and 27, and these rings may be repaired or replaced without the removal of the piston head from the cylinder 10. However, if a very quick repair is needed, the entire piston head structure may be unscrewed from the cylinder 10 and a new one together with a new valve piece 29, may be put in place, after which any necessary repairs to the removed unit may be effected whenever it becomes convenient to do so.

While in the foregoing description and in the accompanying drawing I have disclosed one particular embodiment of the invention more or less in detail, I desire it to be understood that such detailed disclosure has been resorted to primarily for the purpose of fully illustrating the invention in conformity with the requirements of the statute, and that it is not to be construed as amounting to a limitation upon the scope of the invention.

Having thus described my invention, I claim

1. In a fluid strut, a pair of telescoping cylinders, a piston head structure threaded upon the inner end of the inner cylinder and protruding therebeyond, said structure having an inturned portion spaced from the end of the inner cylinder, an inwardly facing valve seat on said inturned portion, and a valve piece adapted to co-operate with said seat, the inner end of the inner cylinder constituting means for limiting the opening movement of the valve piece.

2. In a fluid strut, a pair of telescoping cylinders, a piston head structure threaded upon the inner end of the inner cylinder and protruding therebeyond, said structure having an inturned portion spaced from the end of the inner cylinder, an inwardly facing valve seat on said inturned portion, and a valve piece adapted to co-operate with said seat, the inner end of the inner cylinder constituting means for limiting the opening movement of the valve piece, said head structure beyond said valve carrying annular packing adapted to engage the outer cylinder.

3. In a fluid strut, a pair of telescoping cylinders with spaced walls, the inner cylinder being externally threaded at its inner end, a piston head structure threaded thereupon protruding beyond the end thereof, said head structure having an inturned portion spaced from the end of the inner cylinder, a valve seat on said inturned portion, and a disk shaped valve piece adapted to cooperate with said seat, and having extensions for engagement with the side walls of said head structure and with the end of said inner cylinder to center the valve piece and to stop the opening movement of the valve.

4. In a fluid strut, a pair of telescoping cylinders with spaced walls, a piston head structure secured upon the inner end of the inner cylinder and protruding there beyond, said head structure having a valve seat facing the end of said inner cylinder, and spaced from the end thereof, said head structure having an annular external recess beyond said valve seat, packing means in said recess contacting with the outer cylinder, and a valve piece mounted between said valve seat and the inner end of said inner cylinder.

5. In a fluid strut, a pair of telescoping cylinders, the inner end of the smaller cylinder being externally threaded, a head structure comprising a large diameter portion and a small diameter portion connected by a transverse annular portion, said large diameter portion being threaded onto the threaded end of said smaller cylinder, said annular portion forming a valve seat, a valve for said seat, and said small diameter portion carrying an external packing adapted to engage the wall of the larger cylinder.

6. In a fluid strut, a pair of tubular sheet metal cylinders telescoped together with their walls spaced apart, a stop ring threadably mounted on the inner end of the larger cylinder and bridging the space between the cylinders, and a head structure threadably mounted exteriorly on the inner end of the smaller cylinder and bridging the space between the cylinders, and adopted to engage said stop ring to limit the extension of the strut, said head structure carrying beyond the end of the smaller cylinder a piston packing adapted to engage the wall of the larger cylinder.

In testimony whereof, I hereunto affix my signature.

JOHN F. WALLACE.